INVENTOR.
ROBERT J. CLARK
BY
John T. O'Halloran
Attorney

INVENTOR.
ROBERT J. CLARK
BY
John T. O'Halloran
Attorney

United States Patent Office 3,422,420

Patented Jan. 14, 1969

3,422,420

DISPLAY SYSTEMS

Robert John Clark, Dorion, Quebec, Cañada, assignor to Radio Corporation of America, a corporation of Delaware Filed Mar. 23, 1966, Ser. No. 536,778
U.S. Cl. 340—324 3 Claims
Int. Cl. G08b 23/00

ABSTRACT OF THE DISCLOSURE

A display system that generates characters from digitally stored signals and displays the characters through use of a raster scanning pattern includes means for continuously moving the characters off the display device in one direction while continuously moving new characters onto the opposite side of the display device so that a continuously moving message is displayed.

*Background of the invention*

Display systems that convert binary input signals, corresponding to informational data, into video signals for displaying the data in readable form on a conventional television picture tube have been described in the art heretofore. Such display systems are extremely useful because the informational data can either be broadcast to be displayed on standard television receivers or be transmitted over a closed circuit to be displayed on standard television monitors. In either case, the use of a standard television picture tube as the display device renders the display system less costly than it would otherwise be.

The standard scanning raster of the television picture tube is utilized in such systems to produce the displayed characters. The characters may, for example, comprise alphanumeric symbols and/or other marks. Portions of each scanline in a group of scanlines in the raster are selectively blanked and unblanked so that the scanning beam produces a slice of each character in a row of characters as the scanning beam moves across the display device. Thus, the characters are formed by providing character slices at the proper times so as to build up a complete row of characters at the end of a specific number of scanlines.

To generate the correct video signals each binary input signal is shifted in sequence to a prescribed position during each scanline. In the prescribed position, each binary input signal is sequentially decoded to provide an identify signal for each character to be displayed. Each identify signal is coupled to activate a different group of logic gates. The activation of the logic gates causes the picture tube to be blanked and unblanked at the proper time to display slices of the corresponding character. The sequencing of the binary input signals causes the correct video signals to be applied to the display device at the proper time in the scanlines.

Heretofore such display systems displayed the same group of characters continuously for a period of time, erased the displayed characters, and then displayed the next group of characters, etc. Thus, an entire message was displayed in jumps rather than continuously. It is frequently more desirable to provide a display system capable of displaying information in a continuously moving stream of characters rather than by jumps from and to discrete groups of characters.

Accordingly, it is an object of this invention to provide a new and improved display system.

It is another object of this invention to provide a display system that provides a continuous movement of characters onto and off of a display device.

It is a further object of this invention to provide a display system that displays characters that move in a stream in one or another direction on said display device.

A display system embodying the invention displays a plurality of characters on a display device. The display system causes the characters to move in a continuous stream in one direction on the display device, with new characters replacing old characters that move off the display device until a complete message has been displayed thereon.

In one embodiment of the invention, the display system includes a dot signal generator for generating a plurality of dot signals in repetitive sequences to correspond to elemental spaces or dots on the display device. The sequences of dot signals divide the display device in a first direction into a plurality of character spaces. A line signal generator is incorporated in the display device to generate a plurality of line signals in repetitive sequences to divide the display device in a second direction into a pluraltiy of rows. The combination of one sequence of dot signals and one sequence of line signals effectively defines a character space area. A character generator combines a plurality of dot and line signals to produce character patterns for displaying in the character space areas. Means are provided for periodically shifting each of the character space areas an incremental distance in one of said directions to move the characters displayed in the character space areas in the said one direction.

*Character display*

Figure 1:
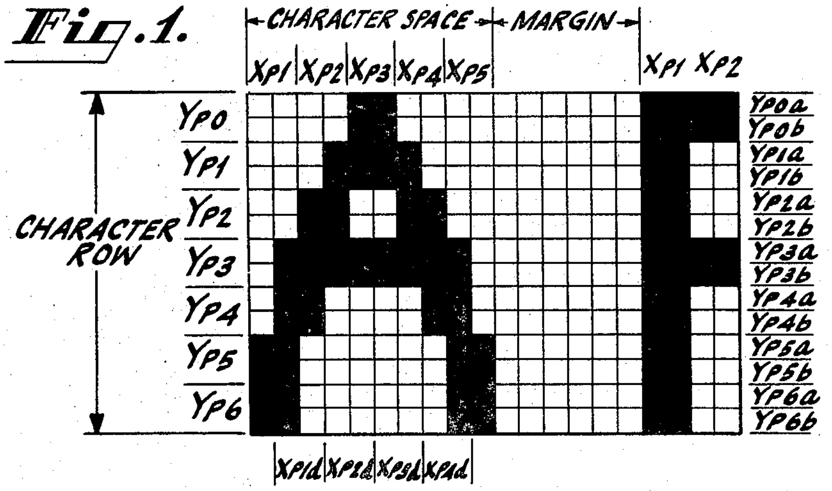
FIGURE 1 is a graphical illustration of the formation of individual character patterns.
Figure 2:
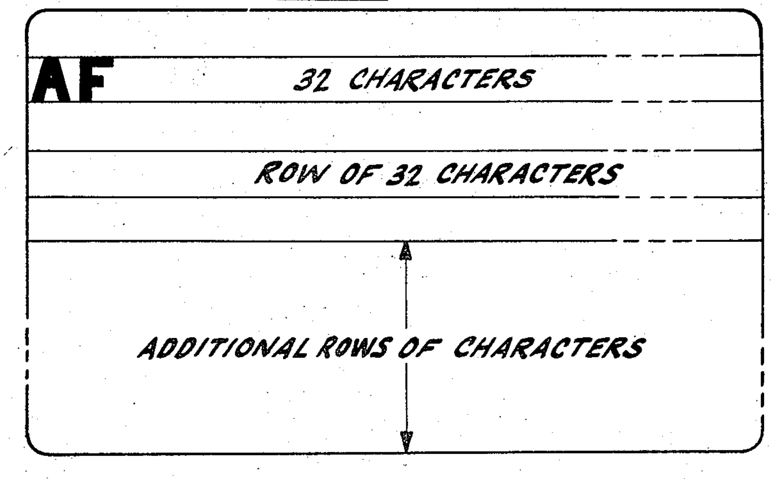
FIGURE 2 is a graphical illustration of the manner in which the character patterns are displayed on the display device.

FIGURES 1 and 2 show the manner in which character patterns are formed and displayed on a display device having a television raster type scanning pattern. As shown in FIGURE 1, each character pattern is composed of a plurality of dots that are produced by the blanking and unblanking of a scanning beam in a display device. In such a device the dots are, of course, white with the background dark, whereas the dots are shown black on a white background in FIGURE 1, for illustrative purposes. The dot spaces in FIGURE 1 are labeled XP1 through XP5 and for convenience this notation is also utilized in the specification to denote the signals that cause dots to be formed in these spaces. It is to be noted that a character, such as A, is five dot spaces wide and is separated by a margin of three dot spaces from the next character. At the beginning of the next character, the dot sequence begins again at XP1 and repeats itself. Thus, in each scanline of the raster the dot signals occur in repetitive sequences. The dot spaces labeled XP1*d* through XP4*d* are created by delaying the XP1 through XP4 dot signals so as to cause bridging between the dot spaces XP1 through XP5. Such bridging eliminates any voids in the character patterns caused by the failure of the dots XP1–XP5 to overlap.

Scanlines in FIGURE 1 are labeled YP0 through YP6. When the scanlines are interlaced, as in a conventional television raster, the odd scanlines are labeled YP0*a* through YP6*a* whereas the even scanlines are labeled YP0*b* through YP6*b*. Line signals that correspond in time to the duration of the active trace scan of a scanline are also referenced YP0 through YP6 and either *a* or *b* throughout the specification for convenience. A predetermined number of scanlines YP0 through YP6 form a character row. The sequence YP0 through YP6 may be repeated for a blank space row and then again for the next row of characters. A sequence of scanlines YP0–YP6 in combination with a sequence of dot spaces XP1–XP5 form a character space area.

A character pattern or outline trace is formed in a character space area on a display device by blanking and unblanking the scanning beam as the beam traverses the display device. Thus, to form the character A, the scanning beam is blanked in scanline YP0 (interlaced scanlines YP0*a* and YP0*b*) during the dot spaces XP1, XP2, XP4 and XP5 and unblanked during the dot space XP3. In the remaining scanlines YP1 through YP6 similar blanking and unblanking occurs until the entire character pattern is formed as shown in FIGURE 1 after a predetermined number of scanlines. The retentivity of vision of the eye is relied upon to build up the impression of a complete character from the separate character slices that are produced each scanline similar to the manner in which a picture is built up in television.

FIGURE 2 illustrates how the character patterns appear on the display device in message form. There may, for example, be a top margin between the upper limit of the display device and the first row of characters as well as a blank row between each row of characters. One row of characters may, for example, comprise 32 characters and during each scanline of the row, a slice of each of the 32 characters is displayed.

*Detailed description of a display system*

Figure 3:
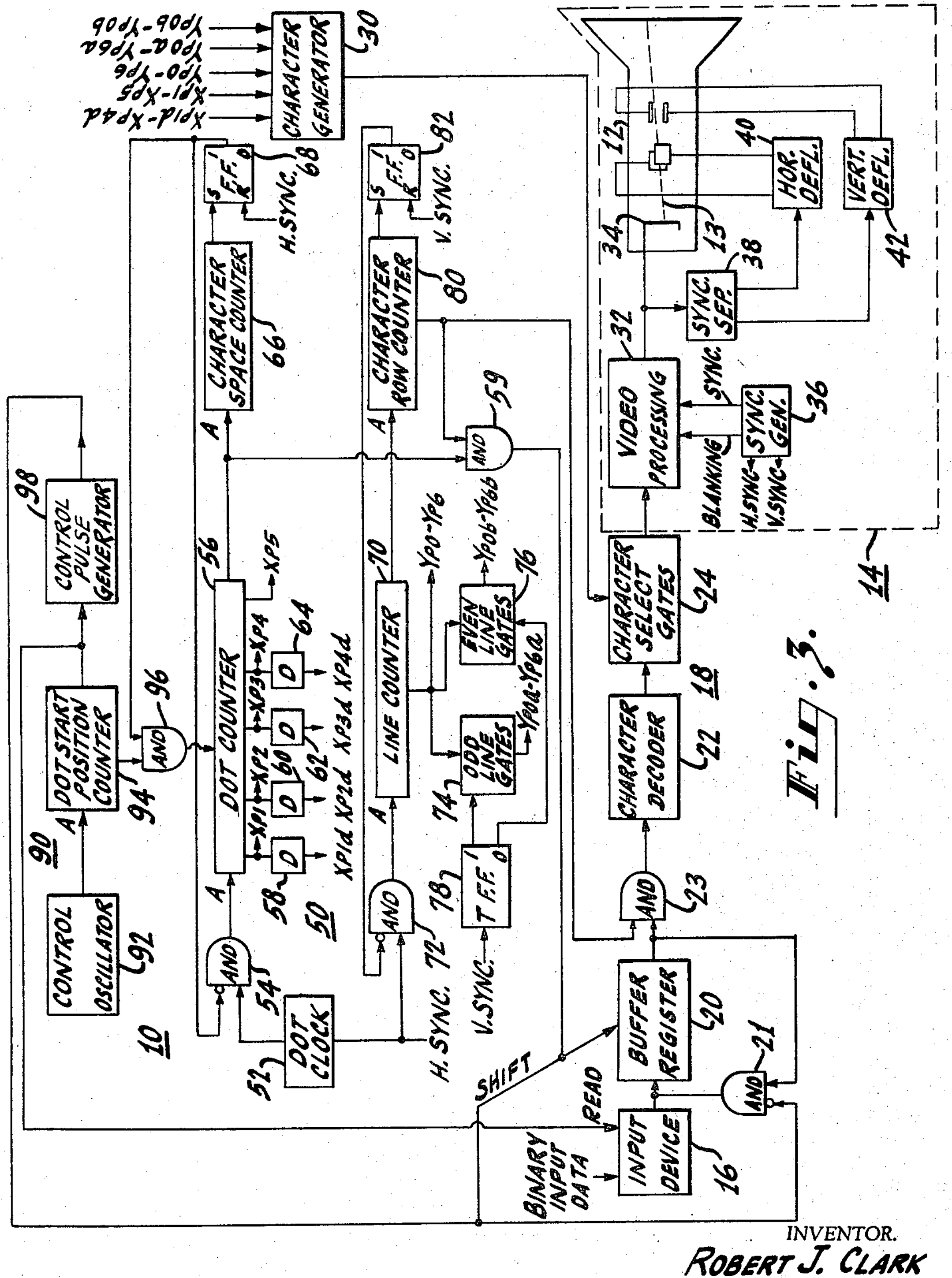
FIGURE 3 is an overall schematic block diagram of a display system embodying the invention.

Referring now to FIGURE 3, a display system 10 embodying the invention displays character patterns on a display device 12 that may, for example, comprise a conventional picture tube incorporated in a television monitor or display set 14. Although the invention will be described as embodied in a display system as shown in FIGURE 3, it is to be noted that the invention is not limited to such display systems. Information to be displayed on the display device 12 is received by an input device or circuit 16 in binary form. The binary input data may, for example, be derived from a punched paper tape and in such case the input device 16 comprises a tape reader. Alternatively, the input device 16 may be any one of a plurality of other devices such as a computer, and in such a case, the binary data is stored in the memory thereof.

*Display channel*

Each binary input character is applied from the input device 16 to a display channel 18. There may, for example, be a plurality of channels in the display system 10 although only one channel is shown in FIGURE 3. When there are a plurality of channels each incorporates the same equipment as that shown in channel 18. The binary data from the device 16 is read into a buffer register 20 in the display channel 18. The buffer register 20 comprises a multi-level shift register having a plurality of serially coupled flip-flop stages for storing the binary coded signals in parallel form. Each character to be displayed on the display device 12 may, for example, comprise a six-bit binary code. Such a code is sufficient to display all the alphanumeric symbols as well as punctuation and other marks. With a six-bit code, the buffer register 20 comprises six parallel levels of stages. The number of characters to be displayed on the display device 12 determines the number of signal stages in the buffer register 20. It is assumed that 32 characters are to be displayed across one character row of the display device 12 and therefore 32 six-level stages are provided in the buffer register 20. When more than one row of characters is to be displayed on the display device more stages are required. The last multi-level stage of the register 20 is coupled back to the first stage thereof through a plurality of AND gates 21. There is one AND gate 21 for each of the six levels of the buffer register 20. Each separate binary code is shifted to be positioned in the output stage of the register 20 once every 32 shift pulses and then is coupled back to the first stage through the AND gate 21 when these gates are enabled. The shift pulses shift simultaneously the 32 binary codes in the register 20 one stage in synchronism with the scanning beam 13 in the display device 12.

The binary code stored in the last stage of the buffer register 20 is applied to a character decoder 22 through AND gates 23. There is one AND gate 23 for each of the six levels of the buffer register 20. The character decoder 22 comprises, for example, a diode matrix which converts each six-bit binary code in the buffer register 20 into a different signal corresponding to an alphanumeric symbol or other mark. The decoded signals from the character decoder 22, corresponding to the different characters, are each applied separately to one of a plurality of character select gates 24. There is one character select gate 24 for each of the characters to be displayed and each gate comprises a logic AND gate. The other input to each of the character select gates 24 comprises a corresponding character pattern signal generated by a character generator 30. A character generator 30 that may be utilized in the display system 10 is described in detail in a copending patent application for R. J. Clark, entitled "Display Systems," filed concurrently herewith, and assigned to the same assignee as the present invention. The character pattern signals selected by the character select gates 24 are amplified and processed in a video processing circuit 32 in the display set 14 and applied to the cathode 34 of the display device 12.

A synchronizing (sync) generator 36 provides the vertical and horizontal synchronizing pulses as well as the blanking pulses for the display system 10. The sync generator 36 supplies horizontal synch pulses at the rate of 15,750 per second or one at the beginning of every scanline in an interlaced raster of 525 scanlines. The generator 36 also supplies vertical sync pulses at the rate of 60 per second or one at the beginning of every field of 262½ scanlines. The sync pulses in the video signal are extracted therefrom by a sync separator 38 that supplies horizontal sync pulses to a horizontal deflection circuit 40 and vertical sync pulses to a vertical deflection circuit 42. The scanning beam 13 is deflected by the electrostatic deflection plates to produce the scanning raster. The sync generator 36, the sync separator 38, and the other circuits in the display set 14 may be conventional television circuits. The sync generator 36 may also be coupled to display sets in other channels in the display system 10 to insure that all the channels are synchronized. It is to be noted that the buffer registers in other channels as well as the buffer register 20 itself may contain a different number of stages than the 32 described for the register 20 if more than one row of characters is to be displayed on these display sets. Depending on the font utilized in the system 10, up to 64 characters can be displayed in one character row and there may be 32 rows of characters displayed.

*Control circuits*

The character patterns to be displayed on the display device 12 are generated in synchronism with the scanning raster of the device 12 by utilizing a control circuit 50. The control circuit 50 includes a pulse generator or dot clock 52 which is synchronized to the display device 12 by horizontal sync pulses applied from the sync generator 36. The dot clock 52 produces a plurality of pulses for each scanline and divides each scanline into a plurality of elemental spaces or dots. To produce 32 character spaces during a typical scanline duration of 50 microseconds requires the dot clock 52 to exhibit a pulse repetition rate of 5.12 pulses per microsecond or a frequency of 5.12 megacycles. The dot pulses generated in the clock 52 are applied to one input of an AND gate 54. The other input to the AND gate 54 is an inhibit input that inhibits the AND gate 54 at the end of a row of characters. The AND gate 54, when enabled, applies the dot pulses to the advance terminal A of a dot counter 56 that functions as a dot signal generator. The dot counter 56 counts each dot pulse and produces, in repetitive sequences, XP1 through XP5 dot signals corresponding to the first five counts in a sequence of eight counts. The direct dot signals XP1 through XP4 are applied to delay circuits 58, 60, 62 and 64, respectively, to produce the delayed dot signals XP1*d* through XP4*d*. At a count of eight, the dot counter 56 produces an output pulse that is coupled to the advance terminal A of a character space counter 66. The output pulse is also applied as a shift pulse to the buffer register 20 when gated through an AND gate 59. The character space counter 66 produces an output at the end of a predetermined number of characters in a scanline. In the assumed embodiment, the counter 66 produces an output after 32 character spaces are counted. The character space counter 66 may, for example, comprise a five-stage binary counter whereas the dot counter 56 may comprise an eight-stage ring counter. Both counters are cleared by a clear pulse derived from the input device 16 at the start of a message to prepare them for the message. When the character space counter 66 counts 32 character spaces, the output signal therefrom is coupled to the set terminal S of a flip-flop 68. The flip-flop 68, when set, produces a signal, for example from the "1" output terminal thereof, that is applied to block or inhibit the AND gate 54. The inhibiting of the AND gate 54 prevents the further counting of dot pulses by the dot counter 56. The flip-flop 68 is reset by a horizontal sync pulse generated in the sync generator 36 at the beginning of each scanline.

The control circuit 50 also produces line signals, one for each scanline with each also having a duration equal to one scanline. The control circuit 50 includes a line counter 70 that counts horizontal sync pulses that occur at the beginning of each scanline. The horizontal sync pulses are applied to one input of an AND gate 72 and the other input to the gate 72 is a signal to inhibit or block the generation of line signals at the end of the required number of character rows. The line counter 70 generates the line signal YP0 through YP6. For systems utilizing interlaced scanning techniques, odd and even line signals are produced in the odd and even line gates 74 and 76. The odd line gates 74 may, for example, comprise a plurality of AND gates, one for each of the line signals YP0 through YP6 generated in the line counter 70. A separate one of the line signals YP0 through YP6 is applied as one input to each of the gates 74 whereas the other input to each gate is an output signal from the "1" output terminal of a triggerable flip-flop 78. The vertical sync pulse occurring at the beginning of each field is applied to the flip-flop 78 to alternately set and reset the flip-flop 78 at the beginning of each sranning field. The "0" output terminal of the flip-flop 78 is coupled to one input terminal of the even line gates 76 with the other input to each of the gates comprising a separate one of the line signals YP0 through YP6. When set, the flip-flop 78 produces odd line signals YP0*a* through YP6*a* and when reset produces interlaced even line signals YP0*b* through YP6*b*.

At the end of a predetermined sequence of line signals, the line counter 70 generates an output signal that is applied to the advance terminal A of a character row counter 80. For the assumed embodiment, the line counter 70 counts seven scanlines or seven horizontal sync pulses before applying an output signal to the character row counter 80. The character row counter 80 counts the number of rows of characters that are to be displayed on the display device. In the assumed embodiment, the count of one terminal is coupled as the second input to each of the AND gates 23 and 59 to activate these gates only at the first character row after the top margin.

When the desired number of character rows to be displayed has been counted, the character row counter 80 produces an output signal that is applied to the set terminal S of a flip-flop 82. The flip-flop 82, when set, produces an output signal from the "1" output terminal thereof that is applied to inhibit the AND gate 72 at the end of the desired character row count. The flip-flop 82 is reset at the end of every scanning field by a vertical sync pulse from the sync generator 36.

The various dot signals both direct and delayed as well as the various line signals both even, odd and combined are applied to the character generator 30. The character generator 30 produces concurrently all of the character patterns that are to be displayed.

*Character space control circuit*

A character space control circuit 90 is included in the display system 10 to shift periodically the character spaces an incremental distance in one direction so as to move the characters displayed on the display device in the said one direction. In the display system 10, it is assumed that the one row of displayed characters is to be moved in a horizontal direction across the display device from right to left. New characters are added on the right to replace characters moving off the display device on the left. A control oscillator 92 is included in the character space control circuit 90 to generate a stream of pulses that shift the character space areas in elemental or dot space for each pulse. The control oscillator 92 is a variable oscillator and may, for example, generate pulses ranging from 1 pulse per second up to 120 pulses per second. The greater the pulse repetition rate the faster the characters move across the display device 12. The control oscillator 92 is coupled to the advance terminal A of a counter 94. The counter 94 functions as a start position circuit for the dot counter 56 and is coupled through the AND gates 96 to the dot counter 56. The counter 94 may, for example, be an 8 stage ring counter and is coupled to apply the one through eight counts through eight AND gates 96, respectively, to the eight stages of the dot counter 56 that produces the XP1 through XP5 dot signals and XP6 through XP8 dot space signals, respectively. At the end of eight counts, the counter 94 returns to a count of zero and such a count produces an output pulse that is applied to the input device 16 to cause another character in a message to be prepared for shifting into the buffer register 20. The output pulse from the counter 94 is also applied to activate a control pulse generator 98. The pulse generator 98 generates a pulse that is applied to shift the buffer register 20 and read into the input stage thereof the next character code from the input device 16. The pulse output from the generator 98 is also coupled to the inhibit terminal of the AND gate 21 to block the recirculation of the character code in the output stage of the buffer register 20 back to the input stage thereof. Such a character has therefore been effectively moved off the display device 12 and is no longer displayed.

*Operation*

In describing the operation of the display system 10, it is assumed that the channel 18 displays a single row of 32 characters in the second row of the display device 12. It is also assumed that a message beginning with the character A is to be displayed by the system 10. Initially, the registers and counters in the display system 10 are cleared by a clear pulse applied to clear each stage in each counter and register. The binary informational data from the input device 16 is then read into the buffer register 20 to fill this register with a portion of the message to be displayed.

The characters displayed on the display device 12 are formed by combining dot and line signals. The dot and line signals are generated in synchronism with the scanlines produced in the display set 14. The vertical sync pulse generated at the beginning of a field of scanlines resets the flip-flop 82 (FIGURE 3) which removes the disabling signal from the AND gate 72. The vertical sync pulse also triggers the flip-flop 78 to produce a signal from the "1" output terminal thereof. The odd line gates 74 are therefore enabled. The horizontal sync pulse at the beginning of a scanline at the beginning of the field resets the flip-flop 68 which removes the disabling signal applied to the AND gate 54.

During the scanning of the top margin of the display device 12, no character patterns are displayed. The AND gates 23 are disabled because the character row counter 80 is at a count of zero. Consequently, the binary code for the character A, which is positioned in the last stage of the buffer register 20, is blocked from the decoder 22 and the remaining circuits in the channel 18. After the first seven horizontal sync pulses have been counted in the line counter 70, an output pulse is produced that advances the character row counter 80 to a count of one and enables the AND gates 23. The binary code for the character A is applied through the AND gates 23 and decoded in the decoder 22 to produce a single output signal denoting the identity of the character. The character identify signal activates the character select gate 24 corresponding to the character A. The corresponding character select gate 24 is therefore prepared to pass the video signal from the character generator 30 that displays a slice of the character A.

The next horizontal sync signal is counted in the line counter 70 and the counter 70 generates the line signal YP0 whereas the odd line gates 74 generate the odd line signal YPO*a*. The dot pulses from the dot clock 52 are counted in the dot counter 56 to produce the various dot signals. As shown in FIGURE 1, no output is produced at the character generator 30 until the dot signal XP3. This pulse is coupled to unblank the cathode 34 of the display device 12 to produce the signal XP3 in scanline YP0*a* on the display device 12. The odd scanline YP0*a* does not produce any more dot signals for the character A. At a count of eight dot signals, the dot counter 56 generates an output pulse that advances the character space counter 66 to a count of one. The output pulse also shifts the buffer register 20. The binary code for the character A is therefore shifted from the output stage of the register 20 through the AND gates 21 back to the first stage of the register 20. The binary code for the character F is shifted into the output stage of the buffer register 20 and is decoded to enable the gate in the character select gates 24 corresponding thereto. Therefore, the top slice of the character F is displayed on the display device 12 during the next character space. Similarly, the top slices in the remaining characters in the messages are displayed during the rest of the scanline YP0*a*.

At the beginning of the next scanline, the horizontal sync pulse advances the line counter 70 to a count of two and generates a YP1 line signal. The odd line gates 74 generate a YP1*a* signal. During this scanline the delayed dot signals XP2*d* and XP3*d* are displayed on the device 12 as shown in FIGURE 1. Each succeeding odd scanline produces a slice of each of the characters in the message to be displayed.

At the end of seven odd scanlines, the line counter produces an output signal that cycles the character row counter 80 back to a count of zero since only one character row is to be displayed and this row is the top row of characters. The AND gates 23 are therefore disabled by the removal of the count of one signal and the gate 23 remains disabled while the scanning beam 13 sweeps down the entire display device. The character row counter 80 also sets the flip-flop 82 and disables the AND gate 72. No character patterns are produced as the scanning beam 13 completes the odd line field.

At the beginning of the even line field, the vertical sync pulse at the beginning of this field resets the flip-flops 78 and 82 and enables the even line gates 76 and the AND gate 72. The odd line gates 74 are disabled. No character patterns are produced during the upper margin because the AND gates 23 remain disabled. When the first seven scanlines produce an output from the line counter 70, the character row counter 80 is shfted to a count of one and enables the AND gates 23.

The line counter 70 on the next scanline generates a YP0 line signal and the gates 76 generate an even line signal YP0*b*. It is to be noted that YP0*b* is interlaced between YP0*a* and YP1*a*. The even scanlines generate the remaining slices of the characters which are inserted between the slices produced in the odd scanlines. Thus, an entire row of characters are displayed and the retentivity of vision of humans as well as the television scanning rate causes them to appear as if they were generated at one single time.

Figure 4:
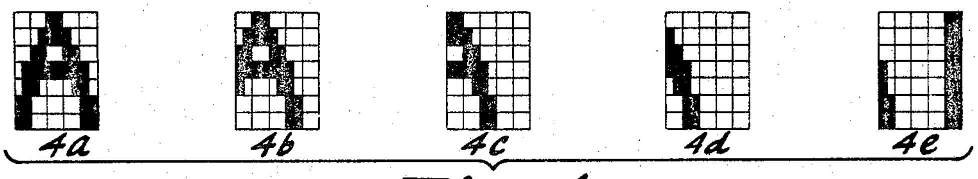
FIGURE 4 is a graphical illustration of the manner in which character patterns are moved in one direction on the display device.

Depending on the setting of the variable control oscillator 92, the character space areas and hence the characters are moved across the display device 12 at different speeds. The movement of the character A as it goes off the display device 12 is shown in sequence in FIGURE 4. It is assumed in this description, that the control oscillator 92 is set to produce 30 pulses per second. FIGURE 4*a* shows the character A before it starts to move off the display device and the character is therefore at the extreme left side of the display. A complete television raster frame of both odd and even interlaced fields is formed every one-thirtieth of a second. Therefore, at each frame the control oscillator 92 produces an output pulse that is counted by the dot start position counter 94. The counter 94 counts the first pulse and at the beginning of the next frame the count is applied to set the dot counter 56 to a count of one. This destroys the previous synchronism between the dot counter 56 and buffer register 20 because the character A no longer has five dot spaces to the end thereof but rather has only four dot spaces. The extreme left side of the character A is wiped out as shown in FIGURE 4*b*. Such a distorted character appears as if it were moving off the display device 12.

The next pulse from the control oscillator 92 causes the next frame to produce a portion of the character A as shown in FIGURE 4*c*. The fourth pulse from the control oscillator 92 not only causes the next frame (FIGURE 4*e*) to produce a smaller portion of the character A but also causes a portion of the character F to appear on an area of the display device 12 that previously displayed only one character or a portion thereof. The eighth pulse of the oscillator 92 resets the eight stage dot position start counter 94 to zero. The counter 94 produces an output signal that is coupled to the input device 16 to prepare the next character in the message for reading into the buffer register 20. The resetting of the counter 94 also activates a control pulse generator 98 that shifts the next character in the message into the buffer register 20. The control pulse from the generator 98 also disables the AND gate 23 to prevent the binary code for the character A from being fed back to the first stage of the register 20.

Thus, the display system 10 moves each character in succession off the display device 12 by periodically and sequentially shifting the position of the start of the first character in the row of characters. A new character is moved onto the display device 12 when an odd character is moved off the device 12. Such movement gives the appearance to a viewer of a moving stream of characters across the display device 12.

It is, of course, apparent that the display system 10 may instead move the message up the screen rather than across it. In such case, each row of the display device 12 is periodically and incrementally shifted by the control oscillator 92 by altering the line counter 70 rather than the dot counter 56.

Thus, a display system embodying the invention moves characters in a continuous flow in one direction on a display device to provide an easily readable and moving message to a viewer.

What is claimed is:

1. A display system for displaying characters on a display device that exhibits a television raster scanline pattern, comprising in combination, means for generating a plurality of dot signals in repetitive sequences during said scanlines to correspond to elemental dots on said display device to divide said device in a first direction into a plurality of character spaces, means for generating a plurality of line signals in repetitive sequences in synchonism with said scanlines to divide said device in a second direction into a plurality of rows, the combination of a plurality of sequences of said dot signals and a plurality of sequences of said line signals forming a plurality of character space areas on said display device for displaying characters on said device, and means for periodically shifting each of said character space areas an incremental distance in one of said directions to move the characters displayed in said character space areas in said one direction.

2. A display system in accordance with claim 1 that further comprises, means for adding a character to a character space area when another character is moved in said one direction off said display device.

3. A display system for displaying characters on a display device that exhibits a television raster scanline pattern, comprising in combination, a dot signal generator for generating during said scanlines a plurality of dot signals to correspond to elemental dots on said display device, a dot signal counter for counting said dot signals in repetitive sequences to divide said scanlines into a plurality of character spaces, means for generating a plurality of line signals in repetitive sequences to divide said device into a plurality of rows, the combination of a sequence of said dot signals and a sequence of said line signals dividing said display device into a plurality of character space areas for displaying characters on said device, means for generating a plurality of control signal pulses, a dot start position counter coupled to count each of said control signal pulses, and means for periodically applying the count in said dot start position counter to said dot signal counter to start said character spaces in a different position on said display device to periodically shift each character space an elemental space and thereby move said displayed characters across said display device.

References Cited

UNITED STATES PATENTS

| | | | |
|---|---|---|---|
| 2,123,459 | 7/1938 | Andersen | 340—339 |
| 2,300,236 | 10/1942 | Rustad | 340—339 |
| 3,140,473 | 7/1964 | Gaffney | 340—324 |
| 3,299,205 | 1/1967 | Stavis | 178—6.8 |

JOHN W. CALDWELL, *Primary Examiner.*

ALAN J. KASPER, *Assistant Examiner.*

U.S. Cl. X.R.

340—339; 315—22; 178—6.8